United States Patent
Langhorst et al.

(10) Patent No.: US 10,214,068 B2
(45) Date of Patent: Feb. 26, 2019

(54) CHASSIS SYSTEM FOR A MOTOR VEHICLE

(71) Applicant: ZF Friedrichshafen AG, Friedrichshafen (DE)

(72) Inventors: Friedhelm Langhorst, Diepholz (DE); Jens Eismann, Melle (DE); Eike Helm, Diepholz (DE); Manfred Buhl, Bissendorf (DE); Albertus Clemens Maria Van Der Knaap, Helmond (NL); Victor Raue, Eindhoven (NL); Jasper Joshua Backx, Alphen (NL)

(73) Assignees: ZF Friedrichshafen AG, Friedrichshafen (DE); DAF Trucks N.V, PT Eindhoven (NL)

( * ) Notice: Subject to any disclaimer, the term of this patent is extended or adjusted under 35 U.S.C. 154(b) by 0 days.

(21) Appl. No.: 15/119,196

(22) PCT Filed: Jan. 12, 2015

(86) PCT No.: PCT/EP2015/050384
§ 371 (c)(1),
(2) Date: Aug. 16, 2016

(87) PCT Pub. No.: WO2015/121006
PCT Pub. Date: Aug. 20, 2015

(65) Prior Publication Data
US 2017/0008361 A1    Jan. 12, 2017

(30) Foreign Application Priority Data
Feb. 17, 2014  (DE) .................. 10 2014 202 831

(51) Int. Cl.
*B60G 13/00* (2006.01)
*B60G 9/00* (2006.01)
(Continued)

(52) U.S. Cl.
CPC ............. *B60G 13/005* (2013.01); *B60G 9/00* (2013.01); *B60G 9/02* (2013.01); *B60G 11/46* (2013.01);
(Continued)

(58) Field of Classification Search
CPC .... B60G 11/64; B60G 13/001; B60G 13/005; B60G 21/051; B60G 21/0551;
(Continued)

(56) References Cited

U.S. PATENT DOCUMENTS 1,971,960 A * 8/1934 Huntman ............... B60G 11/44
267/187
2,186,279 A    1/1940 Austin
(Continued)

FOREIGN PATENT DOCUMENTS

DE    196 24 242 A1    9/1997
DE    198 09 203 A1    9/1999
(Continued)

OTHER PUBLICATIONS

German Search Report Corresponding to 10 2014 202 831.0 dated Sep. 26, 2014.
(Continued)

*Primary Examiner* — Barry Gooden, Jr.
(74) *Attorney, Agent, or Firm* — Davis & Bujold PLLC; Michael J. Bujold

(57) ABSTRACT

A chassis arrangement (10), in particular for utility vehicles (1), with at least one axle (3) that extends transverse to the travel direction and carries wheels (4). Movement of the axle (3) is damped by vibration dampers (11) provided with end sections (15), and with at least one stabilizer assembly (12) that has two longitudinally extending sections (13) and a transverse section (14) that connects the longitudinally extending sections. An end section (15) of the vibration
(Continued)

damper (11) is held directly on and is connected to the stabilizer assembly (12) on an extension (16, 17) of the transversely orientated section (14) beyond the longitudinal section (13).

5 Claims, 4 Drawing Sheets

(51) Int. Cl.
*B60G 21/055* (2006.01)
*B60G 11/64* (2006.01)
*B60G 9/02* (2006.01)
*B60G 21/05* (2006.01)
*B60G 11/46* (2006.01)

(52) U.S. Cl.
CPC ............ *B60G 11/64* (2013.01); *B60G 21/052* (2013.01); *B60G 21/0551* (2013.01); *B60G 2200/21* (2013.01); *B60G 2200/22* (2013.01); *B60G 2200/34* (2013.01); *B60G 2202/1524* (2013.01); *B60G 2204/122* (2013.01); *B60G 2204/129* (2013.01); *B60G 2300/02* (2013.01)

(58) Field of Classification Search
CPC ........ B60G 2200/34; B60G 2202/1524; B60G 2204/122; B60G 2204/1224; B60G 9/00; B60G 13/00; B60G 21/055
See application file for complete search history.

(56) References Cited

U.S. PATENT DOCUMENTS

| | | | |
|---|---|---|---|
| 4,343,375 A | 8/1982 | Manning | |
| 5,005,857 A * | 4/1991 | Camuffo | B60G 3/20 280/124.109 |
| 5,711,544 A * | 1/1998 | Buhl | B60G 7/001 280/124.106 |
| 6,056,305 A * | 5/2000 | Pribyl | B60G 7/02 280/124.157 |
| 6,511,084 B1 * | 1/2003 | Buhl | B60G 7/005 180/349 |
| 7,234,713 B1 * | 6/2007 | Vander Kooi | B60G 9/00 280/124.106 |
| 8,424,890 B2 | 4/2013 | Eismann et al. | |
| 2004/0007843 A1 * | 1/2004 | Reineck | B60G 7/001 280/124.107 |
| 2004/0012167 A1 * | 1/2004 | Buhl | B60G 7/005 280/124.1 |
| 2006/0017252 A1 * | 1/2006 | Oki | B60G 11/183 280/124.106 |
| 2007/0013160 A1 * | 1/2007 | Richardson | B60G 7/006 280/124.116 |
| 2007/0216126 A1 * | 9/2007 | Lopez | B60G 21/055 280/124.106 |
| 2008/0211265 A1 * | 9/2008 | Rochester | B60G 9/022 296/204 |
| 2010/0025953 A1 * | 2/2010 | Buhl | B60G 7/005 280/124.111 |
| 2010/0044988 A1 * | 2/2010 | Rochester | B60G 7/001 280/124.116 |
| 2010/0072723 A1 * | 3/2010 | Ciasulli | B60G 21/055 280/124.106 |
| 2010/0301577 A1 * | 12/2010 | Toepker | B60B 35/02 280/124.106 |
| 2011/0175316 A1 | 7/2011 | English et al. | |
| 2011/0254242 A1 * | 10/2011 | Eismann | B60G 21/052 280/124.106 |
| 2015/0108726 A1 * | 4/2015 | Mosher | B60G 17/0277 280/5.507 |

FOREIGN PATENT DOCUMENTS

DE 100 37 890 A1 2/2002
DE 10 2008 049 940 A1 4/2010

OTHER PUBLICATIONS

International Search Report Corresponding to PCT/EP2015/050384 dated Mar. 25, 2015.
Written Opinion Corresponding to PCT/EP2015/050384 dated Mar. 25, 2015.
International Preliminary Report on Patentability Corresponding to PCT/EP2015/050384 dated May 9, 2016.

* cited by examiner

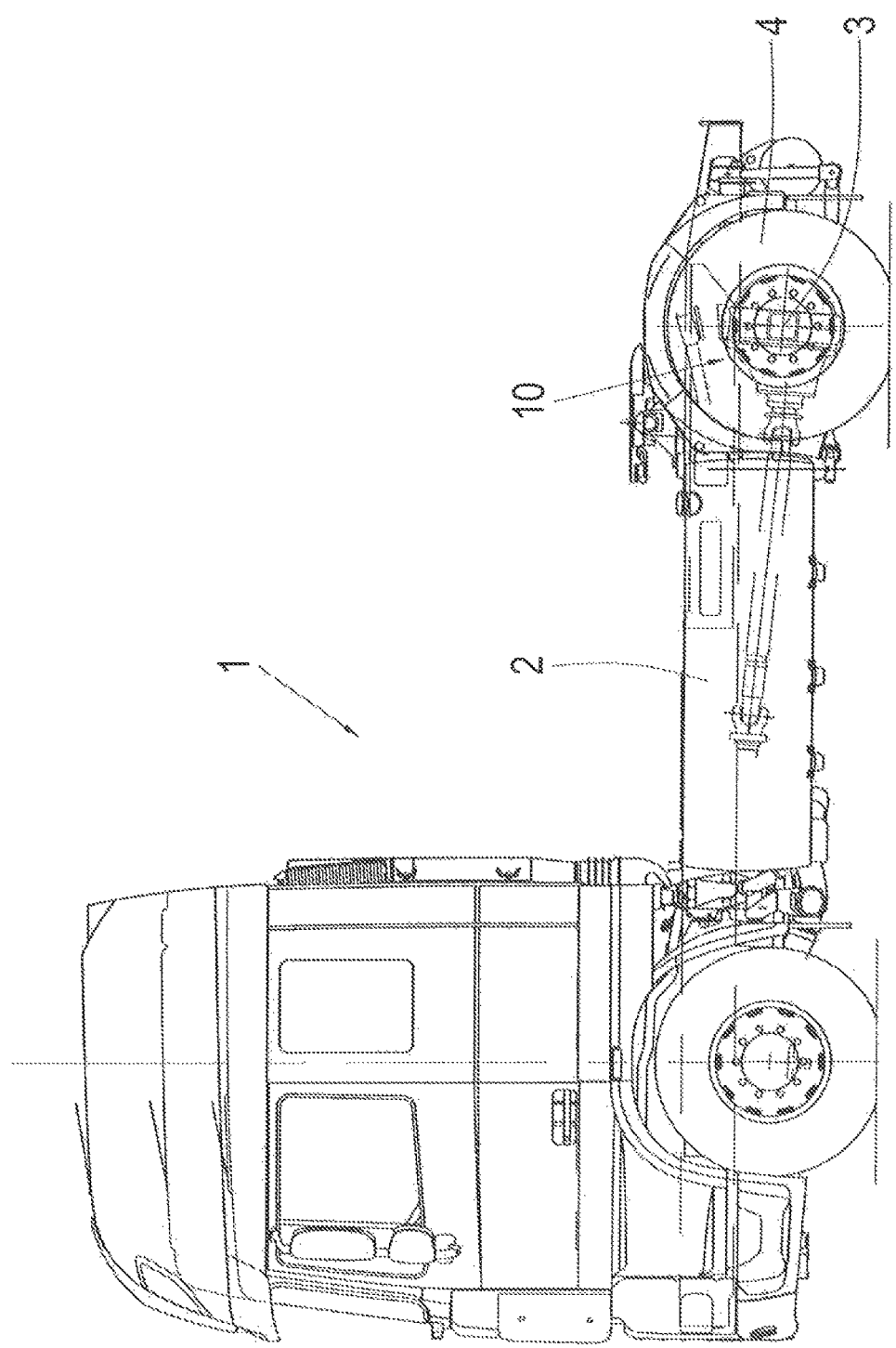

CHASSIS SYSTEM FOR A MOTOR VEHICLE

This application is a National Stage completion of PCT/EP2015/050384 filed Jan. 12, 2015, which claims priority from German patent application serial no. 10 2014 202 831.0 filed Feb. 17, 2014.

FIELD OF THE INVENTION

The invention concerns a chassis arrangement, in particular for utility vehicles (UVs) with at least one axle that extends perpendicularly to the travel direction and supports wheels, wherein the movement of the axle is damped by vibration dampers, and having at least one stabilizer assembly.

BACKGROUND OF THE INVENTION

It is known to keep the axles of utility vehicles (UVs) spring-loaded relative to a vehicle frame by means of air suspension bellows. In this it is often the case that two air suspension bellows per axle are provided on each side of the vehicle, which in relation to the longitudinal direction of the vehicle are arranged relatively far away from the axle so that between these air suspension bellows there is sufficient free space for fitting a vibration damper (shock absorber), which for example is positioned vertically and can be attached at its lower end to the air suspension bellows support and at its upper end to the vehicle frame. However, such an arrangement of air suspensions at a substantial distance away from the axle, which is also a consequence of the fact that between the axle and the frame there is not enough room for the air suspension bellows commonly used until now, is kinematically unfavorable.

More recently, however, it has become known to provide air suspension bellows that take up less vertical space and which can therefore be arranged in relation to the longitudinal direction of the vehicle close to the axle and almost directly next to one another. This allows for a considerably lighter connecting structure to be used between the air suspensions and the axle (air suspension bellows support). In this case it is disadvantageous that the fitting space necessary for the vibration dampers is no longer available and the connection of the vibration dampers therefore entails complex and heavy connection structures.

SUMMARY OF THE INVENTION

The present invention addresses the problem of providing an optimized connection of vibration dampers for vehicles in which fitting space is restricted.

The invention solves this problem by a chassis arrangement with the characteristics, advantageous design features and further developments of the invention as described below.

With the invention a chassis arrangement is provided, in which an end section of the vibration damper is held directly on and is connected to the stabilizer assembly, on an extension of the transversely orientated section beyond the longitudinal section, so that designs both optimized with regard to fitting space and having lower weight are made possible.

In particular such a chassis arrangement is appropriate in vehicles in which a stabilizer assembly is in any case provided, so that for it there is no, or only very little additional expenditure.

The invention allows for an arrangement of air suspension bellows close to the axle and optimized for weight, without which there would arise a space problem for the vibration damper arrangement.

In an expedient design of the invention the vibration damper is connected to the stabilizer assembly by separate flange elements, each provided with an outward-facing pin.

This enables a simply designed and easy-to-assemble connection of the vibration damper to the stabilizer.

In a further design of the invention, the flange element is at least partially inserted into the transversely extending section of the stabilizer assembly.

In a preferred design of the invention, the axle is spring-loaded by means of air suspensions.

In that case, on each axle and on each transverse side of the vehicle two air suspensions are provided on the axle, with the smallest possible distance between them.

The axle can also be sprung by means of leaf springs.

Different geometries can be considered, in that for example the lower end of the vibration damper is held on an extension of a transversely orientated tubular element of the stabilizer assembly, which allows a very simple and kinematically favorable arrangement of the vibration damper.

A motor vehicle with a chassis arrangement according to the invention is described below. Such a chassis arrangement can also be provided on more than one axle. In particular, the vehicle concerned can be a utility vehicle (UV).

BRIEF DESCRIPTION OF THE DRAWINGS

Further advantages and features of the invention emerge from the example embodiments of the object of the invention illustrated in the drawings and described below.

The drawings show:

FIG. 5: A utility vehicle (UV) in the form of a truck, viewed from the side.

DETAILED DESCRIPTION OF THE PREFERRED EMBODIMENTS

Figure 1:
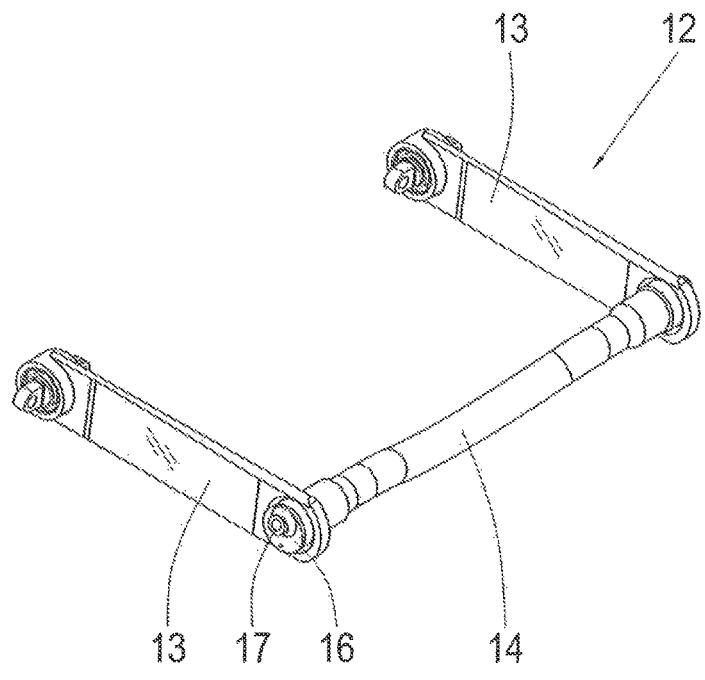
FIG. 1: A perspective representation of a stabilizer assembly with a fitting for holding a vibration damper.
Figure 2:
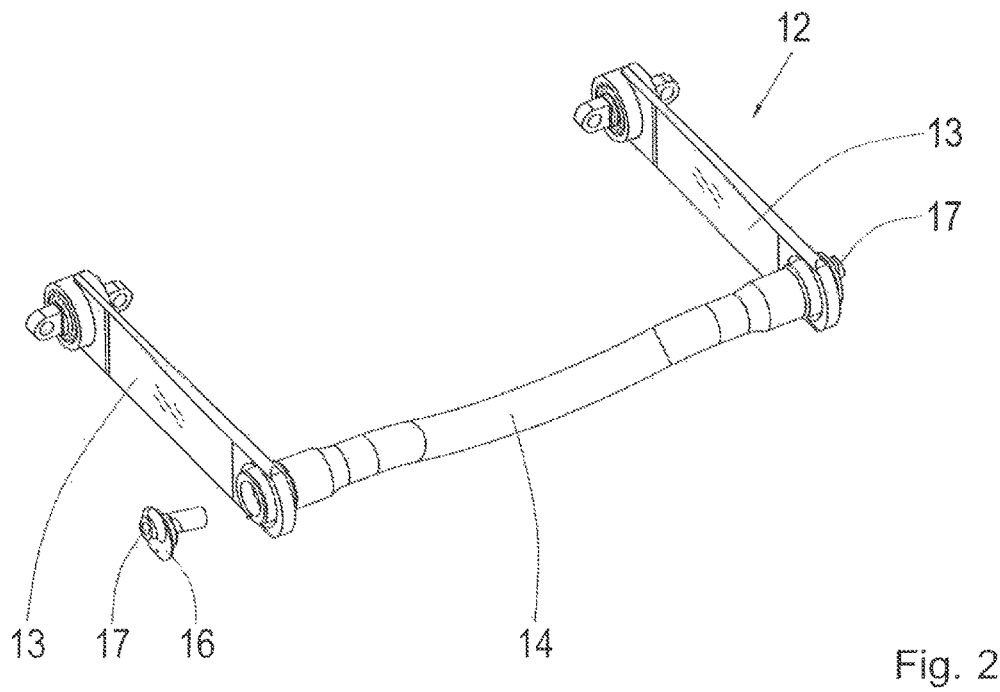
FIG. 2: The components in FIG. 1, shown in an exploded view.

A motor vehicle 1 equipped with one or more chassis arrangements 10 according to the invention is often in the form of a utility vehicle (UV) such as a truck, and comprises a vehicle frame 2. Such a vehicle frame 2 can typically comprise lateral longitudinal members and a plurality of transverse members connecting them together. On the vehicle frame 2 are fitted one or more chassis arrangements 10 for one or more axle(s) 3, each carrying wheels 4. The axle(s) 3 is/are each orientated transversely to the travel direction F. If there are more than one axle 3, it is also possible for the chassis arrangement 10 according to the invention to be provided only on some of the axles, in particular on the rear axles.

As a further example, a construction vehicle or an off-road vehicle can be designed according to the invention.

For the damping of undesired vibrations of the wheels 4, a chassis arrangement 10 comprises at least one pair of laterally arranged vibration dampers 11 which for example inhibit vertical excitations of the axle 3 In addition at least one stabilizer assembly, indexed 12 as a whole, is provided, which supports a transversely extending section 14 by means of lateral, longitudinally extending sections 13. This stabilizer assembly 12 serves to stabilize the vehicle 1 against rolling and in UVs is as a rule present in any case.

In this case a lower end 15 of each respective vibration damper 11 is attached to the stabilizer assembly 12.

Figure 3:
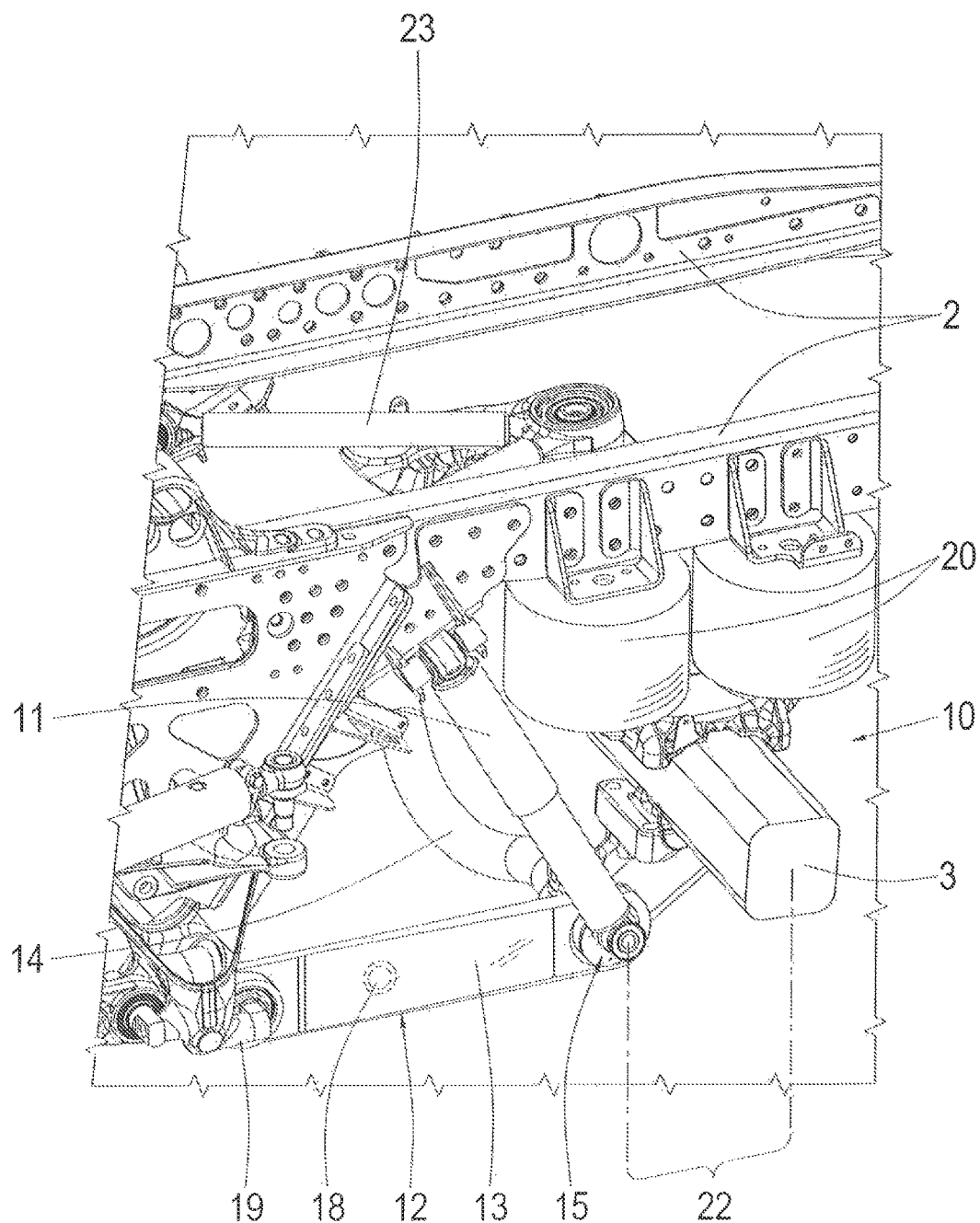
FIG. 3: A perspective view of a chassis arrangement with two air suspension bellows arranged close to the axle and, on each side, a vibration damper held in an extension of a transversely orientated tubular element of the stabilizer assembly.

The transversely extending section 14 can comprise a tubular element, as shown in FIG. 3. This does not have to extend in a straight line in the transverse direction of the vehicle, but can in its shape be adapted to allow room for assemblies that take up space, for example a differential housing.

In the example embodiment shown in FIG. 3, the lower end 15 of the vibration damper 11 is held in the extension of the transversely orientated tubular element of the stabilizer assembly 12. Here, to attach the vibration damper 11 in each case a flange element 16 that can be attached to the stabilizer assembly 12 is provided. This carries a pin 17 that faces transversely outward, on which a lower end 15 of the vibration damper 11, for example in the form of an eye, is fitted and to which it can be connected.

In the arrangement of the vibration damper 11 in the extension of the transversely orientated tubular element 14, the flange element 16 is connected to the open tube ends. The flange elements 16 can be inserted at least partially into the tube ends and, for example, welded or screwed onto them. A press-fitted rubber mounting or the like can also be possible. Thanks to this insertion, the connection is simply designed and easy to fit. Due to its small occupation of space, the fitting has minimal weight and can be fixed into an opening in any case present in the stabilizer assembly 12.

Figure 4:
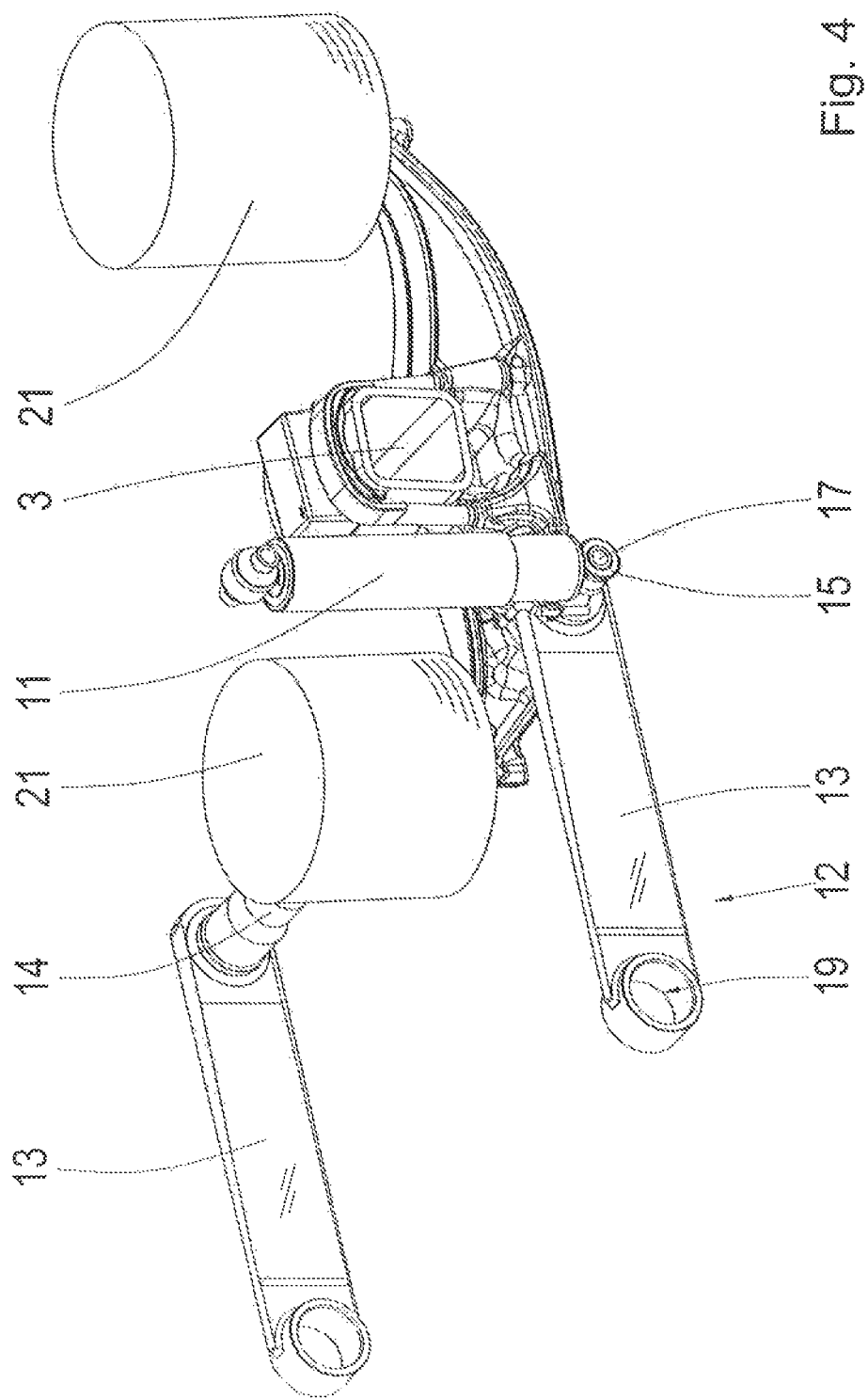
FIG. 4: A partial representation of an alternative chassis arrangement with two air suspension bellows separated longitudinally from one another and a vibration damper held on the stabilizer assembly.

FIGS. 3 and 4 show such chassis arrangements 10, in which the axle 3 indicated is spring loaded by means of air suspension bellows 20, 21. In the example embodiment according to FIG. 3, on each transverse side of the vehicle there are provided two air suspension bellows 20, each of reduced height, fitted closely one behind the other, so that here, by virtue of the invention, a particularly difficult structural space problem is solved. Even if the air suspension bellows 21 are farther apart as in FIG. 4, the invention can be applied with good effect. This too is a simple, reduced-weight version.

Likewise, the invention can be used with axles 3 which are spring loaded by means of leaf springs—not shown here.

The axle 3 can be guided longitudinally and transversely, for example by means of a wishbone control arm 23 as shown in FIG. 3.

In all cases a vibration damper holder 15 is integrated in the stabilizer assembly 12.

Thus, particularly in the case of air suspensions 20 arranged close to the axle, a fitting-space-optimized solution is obtained which can be used with all vehicle variants. With air suspensions 20 arranged close to the axle, there is no need for expensive and heavy connections for the vibration damper 11.

INDEXES

1 Motor vehicle
2 Vehicle frame
3 Axle
4 Wheels
10 Chassis arrangement
11 Vibration damper
12 Stabilizer assembly
13 Longitudinally extending section
14 Transversely orientated section
15 Lower end of the vibration damper
16 Flange element
17 Pin
18 Holding fixture
19 Mounting
20 Air suspension bellows
21 Air suspension bellows
22 Proximity range
23 Wishbone control arm

The invention claimed is:

1. A chassis arrangement, for a utility vehicle, with at least one axle extending transversely to a travel direction and carrying wheels;
   movement of the axle being damped by vibration dampers, each of the dampers having one end connected to a frame of the vehicle and having an opposite lower end;
   at least one stabilizer assembly pivotally connected to the frame of the vehicle comprising two longitudinally extending sections and a transversely orientated tubular, non-linear section, the transversely oriented tubular, non-linear section having axially opposite ends, the ends of the transversely orientated tubular, non-linear section are connected to a first end of the respective two longitudinally extending sections, the lower ends of the vibration dampers being held directly on a respective extension of the transversely orientated tubular, non-linear section, the extensions comprising an outwardly facing pin and a separate flange element which are received at least partially into the ends of the transversely orientated tubular, non-linear section and extend transversely outside the longitudinally extending sections;
   the axle being spring loaded by air suspensions;
   the lower ends of the vibration dampers being directly connected to the two longitudinally extending sections at a location between where the at the least one stabilizer assembly is pivotally connected to the frame of the vehicle and the axle; and
   two air suspensions are supported on each of the at least one axle, on each transverse side of the vehicle, and transversely inside the longitudinally extending sections such that the dampers are located with respect to air suspensions on opposite transverse sides of the longitudinally extending sections, and the two air suspensions are provided in a space saving arrangement in the travel direction over the axle.

2. The chassis arrangement according to claim 1, wherein the opposite ends of the transversely orientated tubular, non-linear section each have an opening, and the flange element is at least partially inserted into the opening of the transversely oriented tubular, non-linear section of the stabilizer assembly such that the flange element is located transversely between the longitudinally extending section and the vibration damper.

3. The chassis arrangement according to claim 1, wherein the lower end of the vibration damper has an eye which is held on the extension of a transversely orientated tubular, non-linear element of the stabilizer assembl.

4. A utility vehicle (UV), with at least one chassis arrangement having at least one axle extending transversely to a travel direction and carrying wheels, and movement of the axle being damped by vibration dampers provided with lower ends;
- at least one stabilizer assembly pivotally connected to the frame of the vehicle comprising two longitudinally extending sections and a transversely orientated tubular, non-linear section, the transversely oriented tubular, non-linear section having axially opposite ends, the ends of the transversely orientated tubular, non-linear section are connected to an end of the respective two longitudinally extending sections, the lower ends of the vibration dampers being held directly on a respective extension of the transversely orientated tubular, non-linear section, the extensions comprising an outwardly facing pin and a separate flange element which are received in the ends of the transversely orientated tubular, non-linear section and extend transversely outside the longitudinally extending sections;
- the axle being spring loaded by air suspensions;
- the lower ends of the vibration dampers being directly connected to the two longitudinally extending sections at a location between where the at the least one stabilizer assembly is pivotably connected to the frame of the vehicle and the axle; and
- two air suspensions are supported on the axle, on each transverse side of the vehicle, and transversely inside the longitudinally extending sections such that the dampers are located with respect to air suspensions on opposite transverse sides of the longitudinally extending sections, and the two air suspensions are provided in a space saving arrangement in the travel direction over the axle.

5. A chassis arrangement for a utility vehicle having at least one axle carrying wheels and extending transverse to a travel direction of the vehicle, the travel direction defining a longitudinal axis;
- vertical movement of the axle being damped by a vibration damper provided with opposite upper and lower ends,
- at least one stabilizer assembly pivotally connected to the frame of the vehicle comprising two longitudinally extending sections and a transversely orientated tubular non-linear element that is connected to axle-side ends of the longitudinally extending sections such that the lower end of the vibration damper is held directly on and connected to the stabilizer assembly on an extension of the transversely orientated tubular non-linear element by an outwardly facing pin that is received within laterally open ends of the transversely oriented tubular non-linear element such that the vibration damper is connected to the stabilizer assembly laterally outside the longitudinally extending section and the lower ends of the vibration dampers are directly connected to the two longitudinally extending sections at a location between where the at the least one stabilizer assembly is pivotally connected to the frame of the vehicle and the axle;
- the axle being spring loaded by air suspensions; and
- two air suspensions are provided on the axle on each transverse side of the vehicle such that the two air suspensions are connected to the stabilizer assembly laterally inside the longitudinally extending section.

* * * * *